(12) United States Patent
George

(10) Patent No.: US 11,102,317 B2
(45) Date of Patent: *Aug. 24, 2021

(54) APPLICATION LOGGING FRAMEWORK

(71) Applicant: Nasdaq, Inc., New York, NY (US)

(72) Inventor: Santhosh P. George, Bangalore (IN)

(73) Assignee: NASDAQ, INC., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/782,479

(22) Filed: Feb. 5, 2020

(65) Prior Publication Data
US 2020/0177690 A1  Jun. 4, 2020

Related U.S. Application Data

(63) Continuation of application No. 15/220,047, filed on Jul. 26, 2016, now Pat. No. 10,581,989.

(30) Foreign Application Priority Data

Jul. 30, 2015  (IN) .......................... 2345/DEL/2015

(51) Int. Cl.
 *G06F 15/16*   (2006.01)
 *H04L 29/08*   (2006.01)

(52) U.S. Cl.
 CPC .............. *H04L 67/22* (2013.01); *H04L 67/02* (2013.01); *H04L 67/146* (2013.01)

(58) Field of Classification Search
 CPC ........ H04L 67/22; H04L 67/02; H04L 67/146
 USPC ......... 709/203, 204, 213; 370/230; 715/243, 715/848, 236, 761, 234, 745, 760
 See application file for complete search history.

(56) References Cited

U.S. PATENT DOCUMENTS

| | | | |
|---|---|---|---|
| 7,774,698 B2 | 8/2010 | Sattler | |
| 10,581,989 B2* | 3/2020 | George | H04L 67/146 |
| 2003/0088617 A1* | 5/2003 | Clark | G06F 9/465 |
| | | | 709/203 |
| 2007/0038544 A1* | 2/2007 | Snow | G06Q 40/00 |
| | | | 705/36 R |
| 2007/0087765 A1* | 4/2007 | Richardson | H04W 8/245 |
| | | | 455/466 |
| 2008/0148145 A1* | 6/2008 | Jacob | G06F 16/958 |
| | | | 715/243 |
| 2008/0270944 A1* | 10/2008 | Balfe | G06F 8/38 |
| | | | 715/848 |
| 2009/0055443 A1* | 2/2009 | Miyamoto | G06F 16/958 |
| 2009/0083707 A1* | 3/2009 | Fujita | G06F 16/986 |
| | | | 717/115 |

(Continued)

OTHER PUBLICATIONS

International Search Report and Written Opinion dated Oct. 7, 2016 for PCT/US2016/044239.

*Primary Examiner* — Thuong Nguyen

(74) *Attorney, Agent, or Firm* — Nixon & Vanderhye, PC

(57) ABSTRACT

The described technology relates to a logging framework wherein identifiers are associated with various elements within a web application, such as pages within the application and portions of pages within the application. Additional identifiers may be associated with sessions within the application, instances of page visits within the application, and other facets of the application and user interactions with the application. The identifiers can be used to generate a log that indicates, among other information, a history of interactions performed by a user navigating the application.

20 Claims, 16 Drawing Sheets

(56) References Cited

U.S. PATENT DOCUMENTS

| | | | | |
|---|---|---|---|---|
| 2009/0300058 A1* | 12/2009 | Ueda | | G06F 16/955 |
| 2010/0067029 A1* | 3/2010 | Marshall | | G06F 40/106 |
| | | | | 358/1.9 |
| 2010/0138477 A1* | 6/2010 | Hanus | | G06F 8/35 |
| | | | | 709/203 |
| 2011/0029489 A1* | 2/2011 | Zhao | | G06F 16/24556 |
| | | | | 707/648 |
| 2011/0047453 A1* | 2/2011 | Catalahana | | G06F 9/451 |
| | | | | 715/236 |
| 2011/0099068 A1* | 4/2011 | Takano | | G06Q 30/02 |
| | | | | 705/14.54 |
| 2011/0246600 A1* | 10/2011 | Kageyama | | G06F 9/544 |
| | | | | 709/213 |
| 2012/0144323 A1* | 6/2012 | Sirpal | | G06F 3/1431 |
| | | | | 715/761 |
| 2014/0122994 A1* | 5/2014 | Beckmann | | G06F 16/54 |
| | | | | 715/234 |
| 2014/0214956 A1* | 7/2014 | Huo | | H04L 67/02 |
| | | | | 709/204 |
| 2014/0280691 A1* | 9/2014 | Buerner | | H04L 67/02 |
| | | | | 709/217 |
| 2015/0089384 A1* | 3/2015 | Lewis | | G06F 16/48 |
| | | | | 715/745 |
| 2015/0113053 A1* | 4/2015 | Warner | | G06F 16/972 |
| | | | | 709/203 |
| 2015/0205755 A1* | 7/2015 | Gilbert | | G06F 15/167 |
| | | | | 726/9 |
| 2015/0278171 A1* | 10/2015 | Lefebvre | | H04L 67/02 |
| | | | | 715/760 |
| 2015/0310482 A1* | 10/2015 | Butler | | G06Q 30/0245 |
| | | | | 705/14.44 |
| 2016/0021656 A1* | 1/2016 | Park | | H04B 7/2662 |
| | | | | 370/329 |
| 2016/0316032 A1* | 10/2016 | Brunn | | H04L 67/06 |
| 2016/0321365 A1* | 11/2016 | Duan | | G06F 16/9535 |
| 2017/0046096 A1* | 2/2017 | Graefe | | G06F 3/0604 |
| 2017/0372700 A1 | 12/2017 | Volkov | | |
| 2020/0177690 A1* | 6/2020 | George | | H04L 67/02 |

* cited by examiner

```xml
<?xml version="1.0" encoding="utf-8" ?>
<Page Id="100000" Name="firm" SubAppId="10000000" SubAppName="IR">
  <Dependencies>
    <Dependency SubApp="Financial">ui.treeview</Dependency>
  </Dependencies>
  <ExternalScripts>
    <SubAppScripts SubApp="Financial">
      <Scripts>
        <Script>research/research.js</Script>
        <Script>research/researchSharedService.js</Script>
        ...
        <Script>research/filters/exactMatchFilter.js</Script>
      </Scripts>
    </SubAppScripts>
    <SubAppScripts SubApp="IR">
      <Scripts>
        ...
        <Script>shared/directives/sharedDirectives.js</Script>
        <Script>events/controllers/detailsController.js</Script>
        ...
      </Scripts>
    </SubAppScripts>
  </ExternalScripts>
  <Directives>
    ...
  </Directives>
  <Filters>
    ...
  </Filters>
  <Views>
    <View Id="2" Name="firm" Url="/firm/:id" TemplateUrl="firmHome.html" Controller="firmController" Entitlements="Research">
      <ChildViews>
        <View Id="21" Name="overview" Url="/overview" TemplateUrl="overview.html" Controller="firmInfoController" />
        <View Id="22" Name="firmcontacts" Url="/firmContacts" TemplateUrl="firmContacts.html" Controller="firmContactController" />
      </ChildViews>
    </View>
  </Views>
  <Sections>
    <Section Id="1" Name="Research" Entitlements="Research" />
    <Section Id="2" Name="Estimate" Entitlements="Estimates" />
  </Sections>
</Page>
```

| Company A | | |
|---|---|---|
| ⤺ OVERVIEW | FIRM CONTACTS | |

Company A — 600

Firm History
Founded: 1977 . Company A

🔗 www.companya.com

📍 London, England ▸

Recent Research

| No research is available. |
|---|

⊕ Earnings Q&A — 602

Full Year 2014/2015 Earnings Call
Mike Smith (Vice President)
06/30/15 01:00 PM

Hi there, good afternoon, everyone. I've got a couple of questions please, firstly going back to India. If you look at the gap between the development spend on a consolidated....

Q1 2015 Earnings Call (IFRS)
John Smith (Security Analyst)
06/30/15 12:00 PM

I have a question in regards to potential options for funding offer which is required to fulfill various investment commitments given different articles in the media in the last few....

| Peers | Mid Sector |

Key Contacts — 601

Contact 1
Security Analyst
📞 44-20-7425-8000
✉ contact1@company.com
Show Coverage Contact 2
Security Analyst
📞 44-20-7677-8130
✉ contact2@company.com
Show Coverage Contact 3
Security Analyst
📞 44-20-7677-8130
✉ contact3@company.com
Show Coverage Contact 4
Security Analyst
📞 44-20-7677-8130
✉ contact4@company.com

FIG. 6A

| Company A... ↻ | OVERVIEW  FIRM CONTACTS | | | |
|---|---|---|---|---|
| 50/238 Shown | ♦ NAME | JOB FUNCTION ▣ | COMPANIES COVERED | SECTORS COVERED | LOCATION ▣ |
| Recent Research | Contact 1<br>44-20-7425-8000<br>contact1@company.com | Fixed Incom Security Analyst | - - | - - | London<br>England |
| No Filter Selected ▸ | Contact 2<br>44-20-7425-8000<br>contact2@company.com | Executive Officer | - - | Macro Sectors: Consumer Cyclicals, Telecommunications Services<br>Mid Sectors: Media & Publishing | London<br>England |
| | Contact 3<br>44-20-7425-8130<br>contact3@company.com | Security Analyst | HLMA-G, SPX-G | Macro Sectors: Industrials<br>Mid Sectors: Machinery/Equipment & Components, Professional & Commercial Services<br>Mico Sectors: Environmental Services & Equipment, Industrial Machinery & Equipment | London<br>England |
| | Contact 4<br>44-20-7425-8000<br>contact4@company.com | Security Analyst | - - | - - | London<br>England |
| | Contact 5<br>44-20-7425-8000<br>contact5@company.com | Economist | - - | Miscellaneous: Emerging Markets | London<br>England |

| NASDAQ OMX Group Inc | DASHBOARD OVERVIEW ESTIMATES RESEARCH CALENDAR NEWS QUOTES & CHARTS FUNDAMENTALS |
|---|---|

| SUMMARY DETAIL PEERS HISTORICAL | | | | | | | | | | |
|---|---|---|---|---|---|---|---|---|---|---|
| NASDAQ OMX GROUP INC (NDAQ-USQ) FY 2014-2015 ▼ (NON PER SHARE IN USD MM, PER SHARE IN USD) | | | | | RECOMMENDATION BUY | PRICE TARGET 53.58 | | | ANALYST COVERAGE FISCAL YEAR END DATE 12/31/15 NEXT REPORT DATE 07/23/15 | |
| | | Q1 MAR-14 | Q2 JUN-14 | Q3 SEP-14 | Q4 DEC-14 | FY DEC-14 | Q1 MAR-15 | Q2 JUNE-15 | Q3 SEP-15 | Q4 DEC-15 | FY DEC-15 |
| EPS | E A | 0.710 0.720 | 0.680 0.720 | 0.696 0.720 | 0.744 0.750 | 2.882 2.880 | 0.778 0.800 | 0.788 | 0.810 | 0.859 | 3.258 |
| ● EBITDA ● ● ● | E ✗ A | 244.40 249.00 | 236.00 250.00 | 244.05 247.00 | 253.48 254.00 | 989.35 998.00 | 253.42 269.00 | 243.60 | 261.17 | 275.79 | 965.63 |
| Revenue | E A | 526.67 529.00 | 517.19 523.00 | 510.60 497.00 | 521.32 517.00 | 2,070.69 2,067.00 | 516.59 507.00 | 505.94 | 526.67 | 524.53 | 2,045.84 |
| Net Income | E A | 123.03 125.00 | 118.58 120.00 | 119.30 125.00 | 128.35 129.00 | 498.50 499.00 | 135.58 138.00 | 137.27 | 123.03 | 146.76 | 561.29 |
| Cash Flow Per Share | E A | — | 0.752 1.160 | 1.497 0.140 | 0.006 | 3.322 3.971 | 0.466 | -0.393 | -0.277 | -0.362 | 4.633 |

View by
Consensus | Broker ▼
Local Currency ▼

Measures
Selected ⑧ All ⑨²
Select Measures
Search Measure...

▸ ⊞ Income Statement
▸ ☐ Balance Sheet
▸ ⊞ Cash Flow Statement
▸ ⊞ Valuation

FIG. 6F

| Product: | | | Module: | | Feature: | | Page: | |
|---|---|---|---|---|---|---|---|---|
| SessionId: | | | OriginId: | | RequestId: | | Count: | Filter |

| Id (701) | Application (702) | UserId (703) | UserName (704) | Parameters (705) | Operation (706) |
|---|---|---|---|---|---|
| 104708 | IRSuite.WebApi | 1069726 | Sample@company.com | Parameters | /IRSuite.Api/Financial/Estimates/GetEventEstimates |
| 104707 | IRSuite.Services | 1069726 | Sample@company.com | Parameters | Corporate.Portal.Financial.Data.query.Estimates.GetEventEstimatesQuery |
| 104706 | IRSuite.Services | 1069726 | Sample@company.com | Parameters | Corporate.Portal.Financial.Data.query.StreetEvents.GetStreetEventsQuery |
| 104701 | IRSuite.WebApi | 1069726 | Sample@company.com | Parameters | /IRSuite.Api/Financial/StreetEvents/GetEventsData |
| 104700 | IRSuite.Services | 1069726 | Sample@company.com | Parameters | Corporate.Portal.Financial.Data.query.StreetEvents.GetEventsDataQuery |
| 104699 | IRSuite.WebApi | 1069726 | Sample@company.com | Parameters | /IRSuite.Api/Financial/StreetEvents/GetStreetEvents |
| 104695 | IRSuite.WebApi | 1069726 | Sample@company.com | Parameters | /IRSuite.Api/Financial/StreetEvents/GetStreetEvents |
| 104694 | IRSuite.WebApi | 1069726 | Sample@company.com | Parameters | Corporate.Portal.Financial.Data.QueryMarketData.GetQuotesQuery |
| 104693 | IRSuite.WebApi | 1069726 | Sample@company.com | Parameters | api/quotes/snaps?1F3M21<sjWT3R71xilv9YMiFobIrWpW5bsWJGoMiiELwrFEDfHLm+8SSO1BkEYqltw91VdeEN5G -GET |
| 104690 | IRSuite.WebApi | 1069726 | Sample@company.com | Parameters | /IRSuite.Api/Financial/Fundamentals/GetFundamentals |
| 104689 | IRSuite.WebApi | 1069726 | Sample@company.com | Parameters | Corporate.Portal.Financial.Data.query.Fundamentals.GetFundamentalsQuery |
| 104688 | IRSuite.WebApi | 1069726 | Sample@company.com | Parameters | api/undamentals/ratios?5bsWJGoMiiELwrFEDfHLm+8SSO1BkEYqltW9IVdeEN5G2NOLBsCr4gvqWgu4CNwY4YMHdtPbnA |
| 104687 | IRSuite.WebApi | 1069726 | Sample@company.com | Parameters | /IRSuite.Api/Financial/Company/GetCompanyOverview |
| 104686 | IRSuite.Services | 1069726 | Sample@company.com | Parameters | Corporate.Portal.Infrastructure.Data.Query.Watchlist.GetwatchlistsByTickerQuery |

| Product: | | Module: | | Feature: | | Page: | |
|---|---|---|---|---|---|---|---|
| SessionId: | | OriginId: | | RequestId: | | Count: | |

| | | 311 | 312 | 709 | 321 | 322 | 323 | 324 |
|---|---|---|---|---|---|---|---|---|
| 707 | 708 | | | | | | | |
| Elapsed | Date | SessionId | OriginId | RequestId | Product | SubApp | Page | View |
| 140ms | 04/15/2015 09:59:33.680AM | RElHgEDiVe4iwALMuDm19JrAJ6g=_1069726 | 4a2b174f-e068-4759-896a-28b59b538f63 | 4a2b174f-e068-4759-896a-28b59b538f63 | 100 | 200000000 | 200000 | 111 |
| 107ms | 04/15/2015 09:59:33.487AM | RElHgEDiVe4iwALMuDm19JrAJ6g=_1069726 | 4a2b174f-e068-4759-896a-28b59b538f63 | 4a2b174f-e066-4759-896a-2Bb59b53B f63 | 100 | 200000000 | 200000 | 111 |
| 4Bms | 04/15/2015 09:59:32.887AM | RElHgEDiVe4iwALMuDm19JrAJ6g=_1069726 | 20325ac5-b5e8-4616-8d63-97c7da705967 | 20325ac5-b5e8-4616-Bd63-97c7da705967 | 100 | 200000000 | 200000 | 111 |
| 27ms | 04/15/2015 09:59:33.730AM | RElHgEDiVe4iwALMuDm19JrAJ6g=_1069726 | 63Dd4144-b6a2-4714-ac97-6a174d6124cc | 63Dd4144-b6a2-4714-ac97-6a174d6124cc | 100 | 200000000 | 200000 | 111 |
| 4ms | 04/15/2015 09:59:33.980AM | RElHgEDiVe4iwALMuDm19JrAJ6g=_1069726 | 630d4144-b6a2-4714-ac97-6a174d6124cc | 630d4144-b6a2-4714-ac97-6a174d6124cc | 100 | 200000000 | 200000 | 111 |
| 123ms | 04/15/2015 09:59:33.180AM | RElHgEDiVe4iwALMuDm19JrAJ6g=_1069726 | 20325ac5-b5e8-4616-8Cl63-97c7da705967 | 20325ac5-b5e8-4616-Bd63-97c7ca705967 | 100 | 200000000 | 200000 | 111 |
| 812ms | 04/15/2015 09:59:29.833AM | RElHgEDiVe4iwALMuDm19JrAJ6g=_1069726 | 49f3a17f-1877-47d0-b37D-e8d21c25a774 | a41D04de-99Bb-46ab-afbc-1c1555a7dff0 | 100 | 200000000 | 200000 | 111 |
| 768ms | 04/15/2015 09:59:29.833AM | RElHgEDiVe4iwALMuDm19JrAJ6g=_1069726 | 49f3a17f-1877-47d0-b37D-e8d21c25a774 | a41D04de-99Bb-46ab-afbc-1c1555a7dff0 | 100 | 200000000 | 200000 | 111 |
| 741ms | 04/15/2015 09:59:29.817AM | RElHgEDiVe4iwALMuDm19JrAJ6g=_1069726 | 49f3a17f-1877-47d0-b37D-e8d21c25a774 | a41D04de-99Bb-46ab-afbc-1c1555a7dff0 | 100 | 200000000 | 200000 | 111 |
| 347ms | 04/15/2015 09:59:29.340AM | RElHgEDiVe4iwALMuDm19JrAJ6g=_1069726 | 49f3a17f-1877-47d0-b370-e8d21C25a774 | 51071707-4b5a-42d6-81af-6db51abf4c4f | 100 | 200000000 | 200000 | 111 |
| 337ms | 04/15/2015 09:59:29.340AM | RElHgEDiVe4iwALMuDm19JrAJ6g=_1069726 | 49f3a17f-1877-47d0-b370-e8d21C25a774 | 51071707-4b5a-42d6-61af-6db51abf4C4f | 100 | 200000000 | 200000 | 111 |
| 315ms | 04/15/2015 09:59:29.323.AM | RElHgEDiVe4iwALMuDm19JrAJ6g=_1069726 | 49f3a17f-1877-47d0-b370-e8d21C25a774 | 51071707-4b5a-42d6-81af-6db51abf4c4f | 100 | 200000000 | 200000 | 111 |
| 64ms | 04/15/2015 09:59:29.310AM | RElHgEDiVe4iwALMuDm19JrAJ6g=_1069726 | 49f3a17f-1877-47d0-b370-e8d21c25a774 | 72867792-db4c-4e82-9577-b4cb534eeb*O | 100 | 200000000 | 200000 | 111 |
| 4ms | 04/15/2015 09:59:29.200AM | RElHgEDiVe4iwALMuDm19JrAJ6g=_10697266 | 49f3a17f-1877-47d0-b370-e8d21C25a774 | 72867792-db4c-4e82-9577-b4cb534eebbO | 100 | 200000000 | 200000 | 111 |

APPLICATION LOGGING FRAMEWORK

CROSS REFERENCE TO RELATED APPLICATION(S)

This application is a continuation of U.S. patent application Ser. No. 15/220,047 filed Jul. 26, 2016, which is related to the commonly assigned application entitled "Software Application Architecture" (U.S. patent application Ser. No. 15/219,913), which was filed on Jul. 26, 2016, each of which are hereby incorporated by reference for all purposes. This application also claims priority to Indian Patent Application No. 2345/DEL/2015 filed on Jul. 30, 2015, the entire contents of which are hereby incorporated by reference for all purposes.

BACKGROUND

In traditional web application designs, a web application is composed of a number of different web pages. To render a particular web page within the application, the following set of interactions is performed: a web browser at a client device requests (using a Hypertext Transfer Protocol (HTTP) message) a particular web page from a web server; in response, the web server transmits (using HTTP) the code for the page back to the web browser, the code including, e.g., Hypertext Markup Language (HTML), JavaScript®, and Cascading Style Sheets (CSS) code; the web browser then loads the code and renders the page, thereby enabling a user to view and interact with the page. When the user subsequently wants to view different content within the application, the user will click a hyperlink or input on the page that points to a different page within the application, and then the above-mentioned request/response/load/render procedure is performed for the different page.

Single-page applications (SPA) are web applications that operate within a single web page. In an SPA, the content for a single web page is sent by the web server to the web browser, and that page is loaded/rendered, as described above with the traditional web application. Subsequently, when the user wants to view different content within the application, the user will click a hyperlink or input on the page. But instead of navigating to a different page in the way described above with the traditional web application, the same page will remain loaded, and its content will be dynamically updated. This dynamic updating may be accomplished in a number of different ways; it may involve, for example, the web browser performing background HTTP fetches for new content, updating the Document Object Model (DOM) of the page (via JavaScript code), and/or other techniques.

A web application framework that can be used to create SPAs is AngularJS®. AngularJS is a JavaScript framework. When developing an AngularJS application, the developer creates HTML templates according to AngularJS's template language; the HTML templates include HTML that is embedded with AngularJS scripts and other AngularJS coding constructs, such as directives. At the web browser, AngularJS JavaScript libraries are loaded and interpret the HTML templates, such that the resulting pages look and behave as defined in the templates.

FIG. 1A shows a number of different aspects of a sample SPA 150 of the related art. FIG. 1A shows an example HTML code block 152 for the SPA 150 (the code block 152, which includes AngularJS code), a data model 154 corresponding to the SPA 154, and an example user interface 156 produced by the SPA 150. As will be described in more detail below, the HTML code block 152 may be processed by a web browser; during this processing, the SPA 150 may be represented according to the shown data model 154; and the resulting example user interface 156 may be generated based on the data model 154 and shown in a window of the web browser.

As shown in FIG. 1A, the code block 152 defines a content controller (called "contentCtrl") as part of a content module; when the code block 152 is being processed, the SPA 150 can use the content controller to populate/generate the resulting user interface 156.

In the example code block 152 shown in FIG. 1A, a division element (i.e., <DIV> element) is identified by the ID of "contentModule" and contains a string with the text "Today is." Additionally, this <DIV> element is associated with a content controller (called "contentCtrl"); and the contentCtrl is defined as having a function called "getDate( )" which is defined using a "$scope" object. Thus, when the web browser processes the code block 152, it will load the contentCtrl and call its getDate( ) function. The web browser, during the processing, will also read in the "Today is" string from within the <DIV> element, and append the result of the getData( ) function to the "Today is" string, resulting in the example "Today is 4/16/2015" string shown in the user interface 156.

FIG. 1B shows a non-limiting example system 140 of the related art, the system 140 including a client device 100 and server 120. FIG. 1B also shows an example sequence of events that occurs, as defined in the related art, when the client device 100 requests to load a particular web page hosted at the server 120 using conventional AngularJS techniques.

At action 101, the client device 100 can transmit an HTTP request message to the server 120. At action 102, the server 120 can transmit to the client 100 a corresponding HTTP response message that includes raw/"uncompiled" HTML. At action 103, the web browser (running in the client device 100) can fetch various AngularJS modules comprising an SPA. At action 104, the client device 100 can perform an AngularJS bootstrap phase of loading the SPA and the associated modules.

At action 105, upon completing the bootstrap phase, the client device 100 can then begin compiling the AngularJS SPA, thereby producing the initial user interface (which may be composed of displayable code/data, such as HTML in conjunction with CSS and other code) for the page. It should be appreciated that the compiling referred to herein relates to AngularJS compiling service. The AngularJS compiling service operates in two phases. First, the compiling service will traverse the DOM and collect all of the directives to create a linking function. Next, the compiling service combines the directives with a scope object to produce the user interface that will be displayed. The scope object is an application object that can take "ownership" of variables and functions. For example, the scope object takes ownership of the "getDate( )" function (as shown in FIG. 1A) that is responsible for generating the current date value that is stored in variable "date."

At action 106, the page enters a runtime data binding phase, during which the page's user interface is displayed at the client device 100. During this phase, the user of the client device 100 can interact with the page's user interface and view data displayed in the user interface. The client device 100 can allow the user to interact with the SPA until termination (at action 107), which could occur based on any variety of triggering events (e.g., the page being reloaded, or the user navigating away from the page).

As noted above, when the page for an SPA is loaded, its contents can be changed through dynamic updating. In AngularJS, the AngularJS "routing" service is one mechanism for structuring how dynamic updating is performed. The AngularJS routing service operates generally as follows: For a given Angular SPA, multiple "views" can be defined; each view is associated with an HTML template that may include AngularJS coding constructs. When a page/SPA is first loaded, each of the HTML views is associated with a particular URL path (or "route"), and the correspondences between views and URL paths are registered with the routing service. As an example, the baseline URL for a page/SPA may be "http://example.com/app," and may include two views, View One and View Two. View One may have a route of "viewone" and be accessible at the URL "http://example.com/app#viewone," while View Two may have a route of "viewtwo" and be accessible at the URL "http://example.com/app#viewtwo." When the page/SPA first loads, it may default to View One and the user interface produced by View One will be displayed in the web browser application. Then, when the user clicks on a link that points to the URL "http://example.com/app#viewtwo," the page/SPA will, via the AngularJS routing service, dynamically load and then display the user interface produced by View Two; this may include performing asynchronous/background HTTP fetches to obtain the content for View Two, and then correspondingly updating the DOM for the page. From the perspective of the user, it may appear as if the user has navigated to an entirely different page (and, in fact, the URL shown in the web browser application will have changed); however, the same page/SPA remains loaded, while only the underlying view has changed.

In addition to AngularJS, a number of other frameworks have been developed that may be used to develop SPAs, including but not limited to Backbone.js, Ember.js, and React.

While extant SPA frameworks have proven to be useful, they possess a number of limitations. Accordingly, improvements in the areas of web technology, SPA technology, and related technology areas are needed.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

SUMMARY

The described technology relates to a logging framework wherein identifiers are associated with various elements within a web application, such as pages within the application and portions of pages within the application. Additional identifiers may be associated with sessions within the application, instances of page visits within the application, and other facets of the application and user interactions with the application. The identifiers can be used to generate a log that indicates, among other information, a history of interactions performed by a user navigating the application.

This Summary is provided to introduce a selection of concepts in a simplified form that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

FIG. 4 shows a non-limiting example of an XML configuration file that defines the identifiers associated with a web page;

FIGS. 6A-6G show non-limiting example embodiments of user interfaces and corresponding requests made between a client and server;

FIGS. 7A and 7B show non-limiting example embodiments of a user interface showing one or more aspects of a log for tracking and identifying requests.

DETAILED DESCRIPTION

Figure 1A:
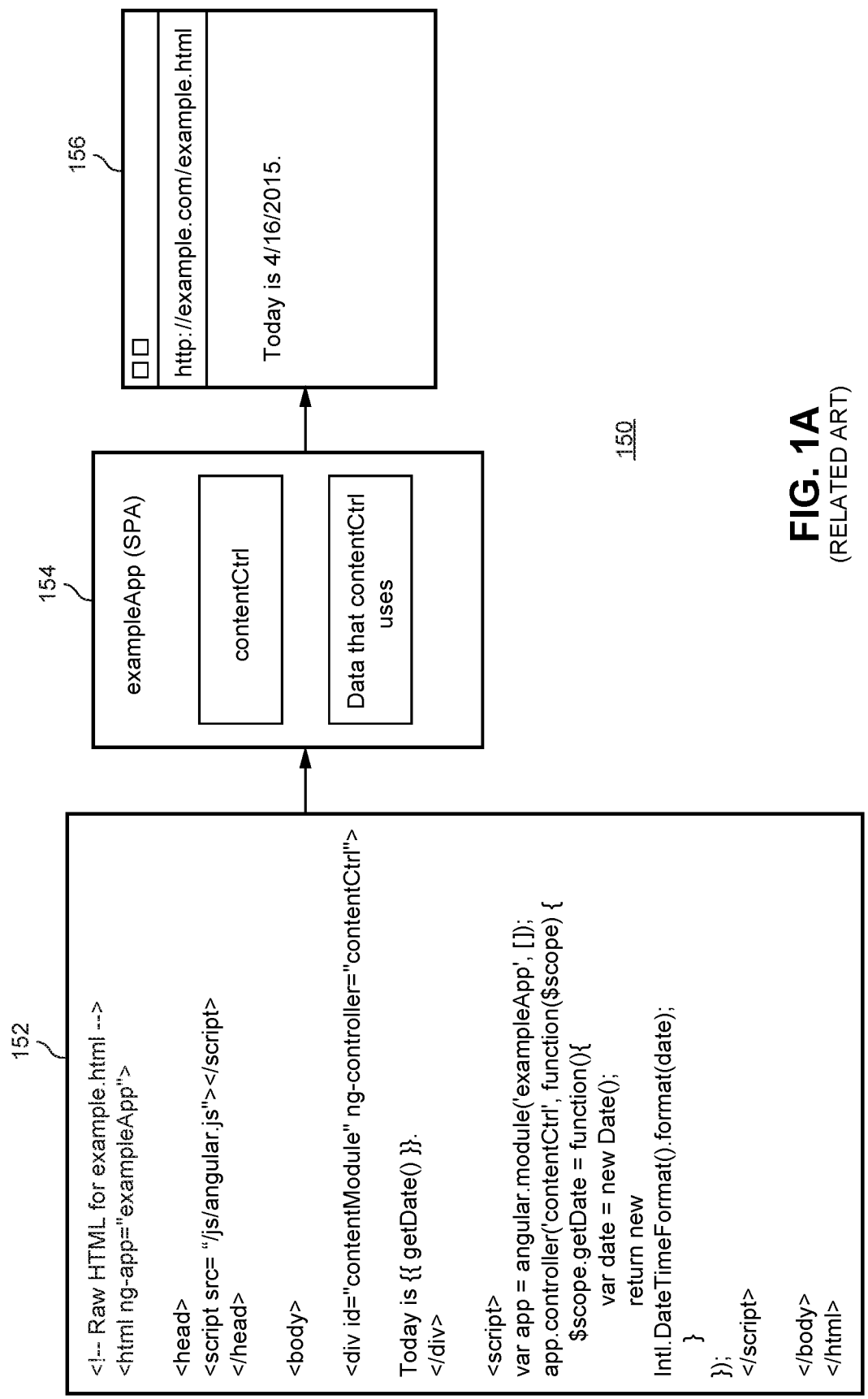
FIG. 1A illustrates a non-limiting example diagram depicting a sample application framework of the related art.
Figure 1B:
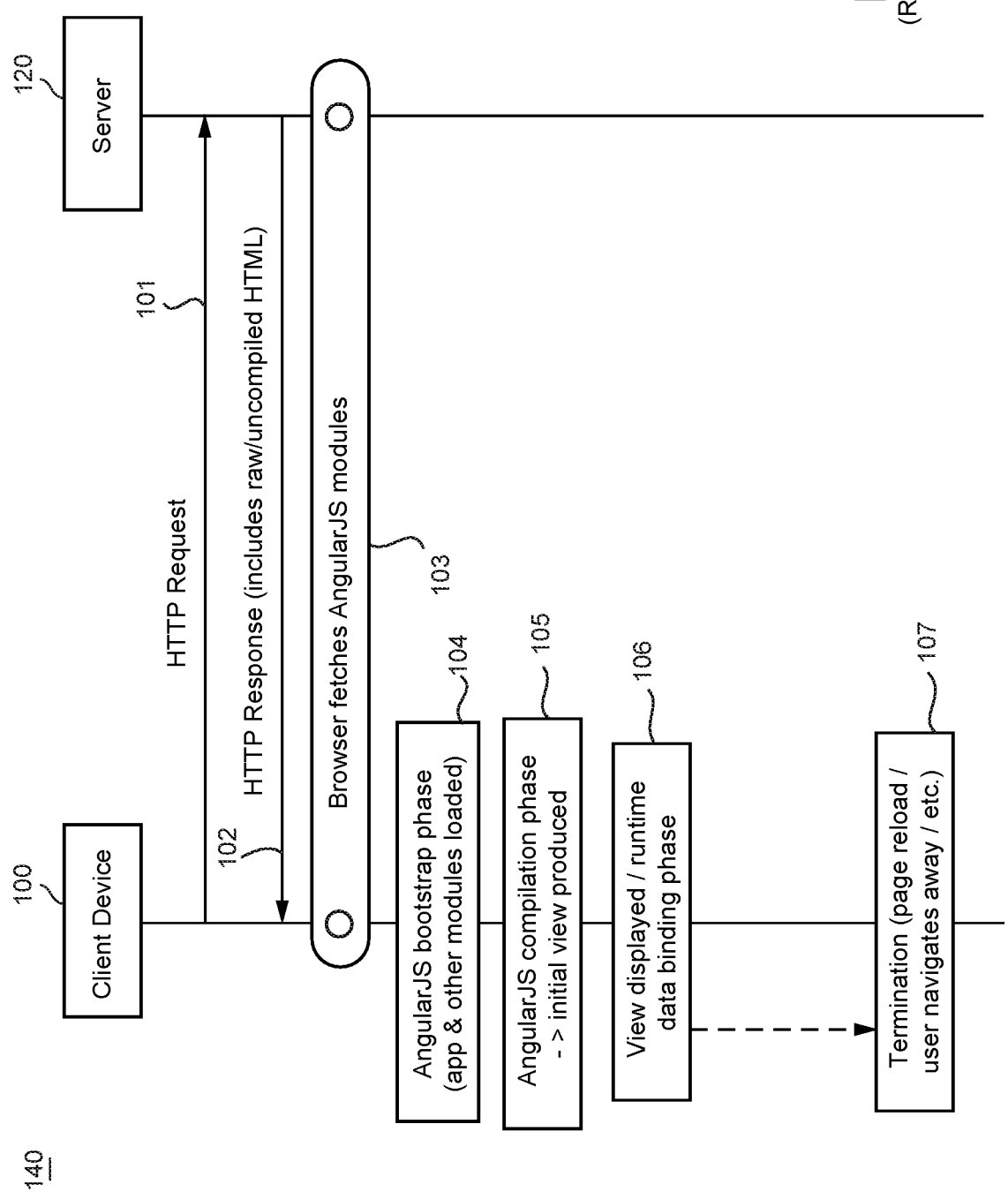
FIG. 1B shows a non-limiting example communication process between a client and server of the related art.

Section headings are used throughout this Detailed Description solely in order to orient the reader as to the general subject matter of each section; as will be seen in the following text, the description of many features spans multiple sections, and headings should not be read as affecting the meaning of the description included in any section.

Selected Definitions

When it is described in this document that an action "may," "can," or "could" be performed, that a feature or component "may," "can," or "could" be included in or is applicable to a given context, that a given item "may," "can," or "could" possess a given attribute, or whenever any similar phrase involving the term "may," "can," or "could" is used, it should be understood that the given action, feature, component, attribute, etc. is present in at least one embodiment, though is not necessarily present in all embodiments.

As used in this document, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage.

As used in this document, the term "and/or" includes any and all combinations of one or more of the associated listed items.

Overview

The technology described herein relates to, among other topics, a logging framework that may be used for identifying and tracking user interactions within a web application. When a user accesses an application, a variety of different identifiers may be generated and used to track and identify items of information such as the different pages within the application that are viewed, sessions that relate to the user's use of the application, and/or HTTP request messages made as a result of user interactions with the application. For example, when the user logs into the web application, a session identifier can be generated that is associated with the user's session as they navigate pages in the application.

When a client device makes a request to load a page, a server can generate the code for the page and the identifiers can be incorporated into the code for the page; and some of the identifiers in the code may be associated with each of the individual views for the page. The server will then transmit the code for generating the page to the client device; then, the client device may load the page and the associated identifiers will be embedded within the loaded page. When subsequent HTTP request messages are made (whether, for example, when that page is first loading, when the user navigates to another page, or when the user interacts with the page in some way that will result in a modification to the content of the page), the HTTP request messages may include the embedded identifiers.

In some embodiments, the server can create a log by storing the identifiers that were embedded in received HTTP request messages. The log can be generated and displayed using a user interface that is used by administrators of the application, as discussed in more detail below.

In some embodiments, the described logging framework may be used in conjunction with a multiple-SPA application architecture such as the architecture described in detail in commonly assigned application entitled "Software Application Architecture" (U.S. patent application Ser. No. 15/219,913), which was previously incorporated by reference for all purposes. In this multiple-SPA architecture, an application may have multiple single page applications (SPAs) associated with the application; in turn, each page can comprise one or more views (i.e., HTML templates that are available at different routes/paths). Of course, the described logging framework may also be used in conjunction with any other appropriate application architecture.

Figure 2:
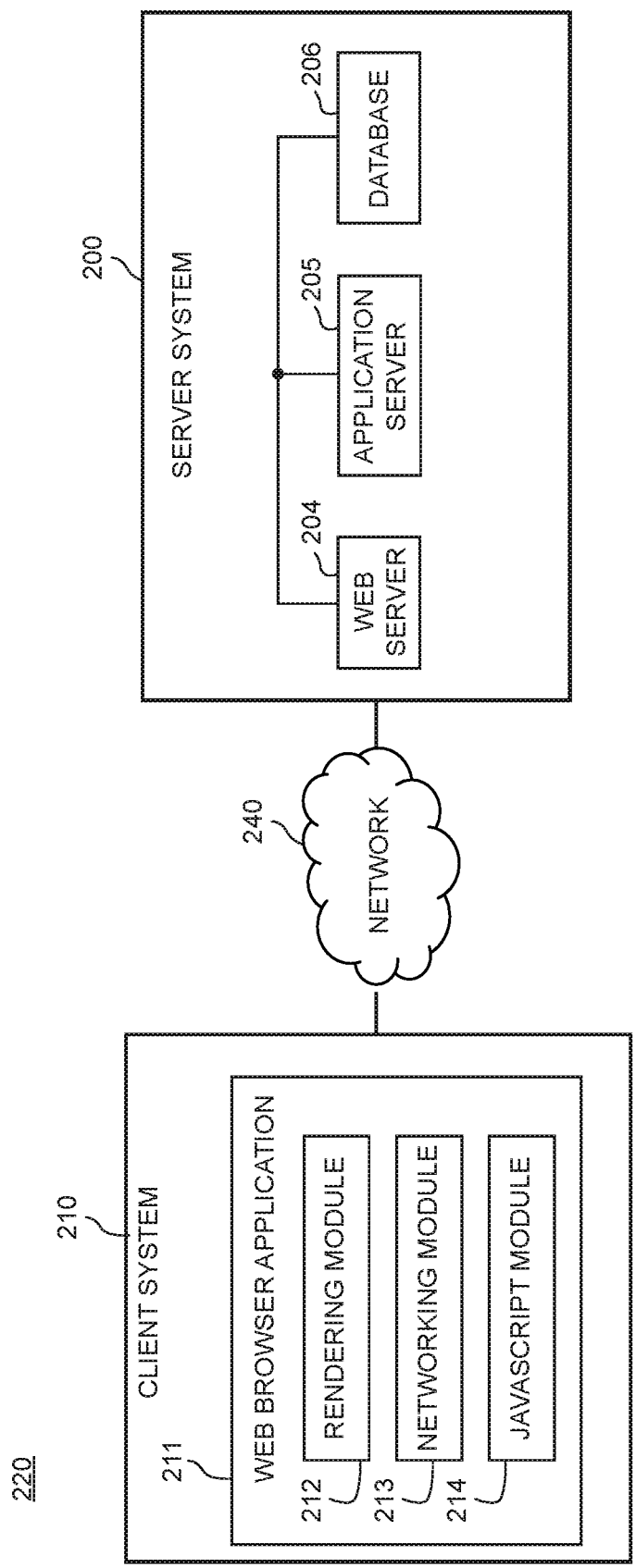
FIG. 2 shows a non-limiting example diagram of a system for carrying out the processes required for implementing the software framework.
Figure 3:
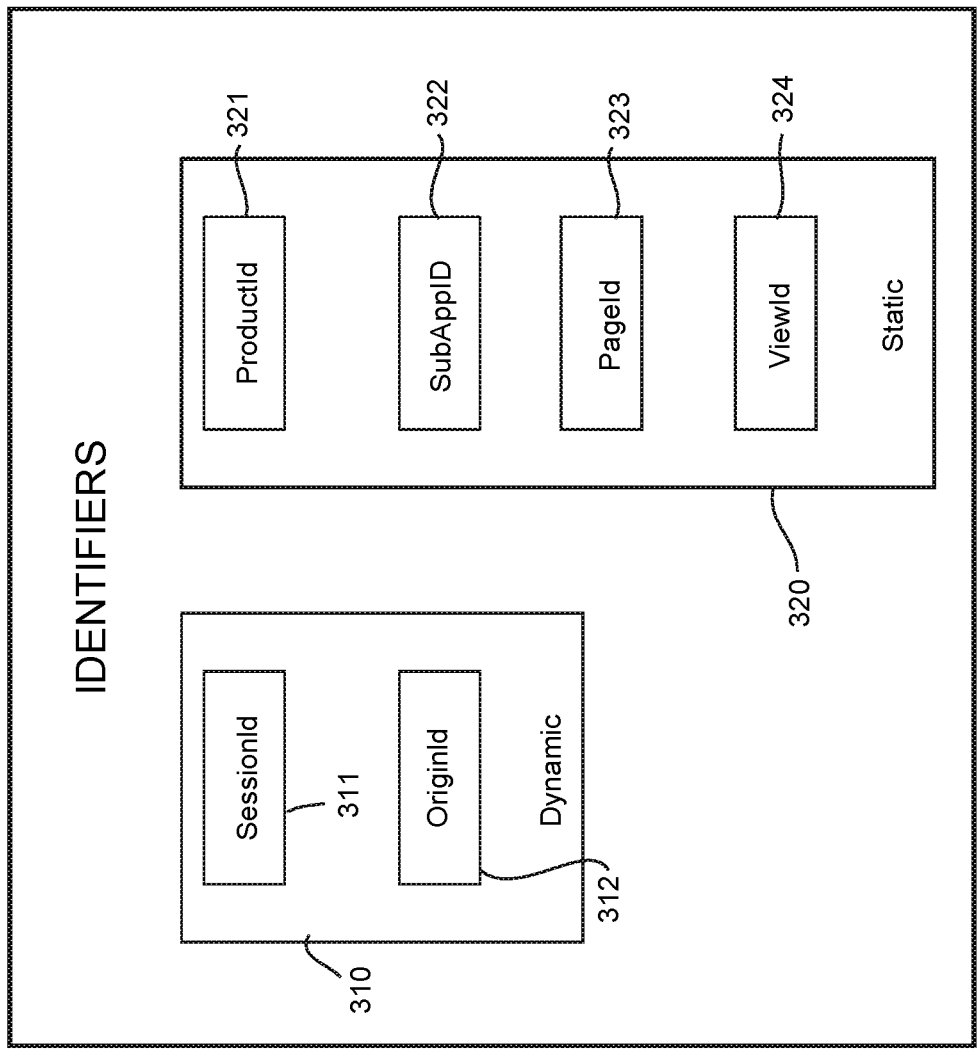
FIG. 3 shows a non-limiting example structure of different identifiers.
Figure 5:
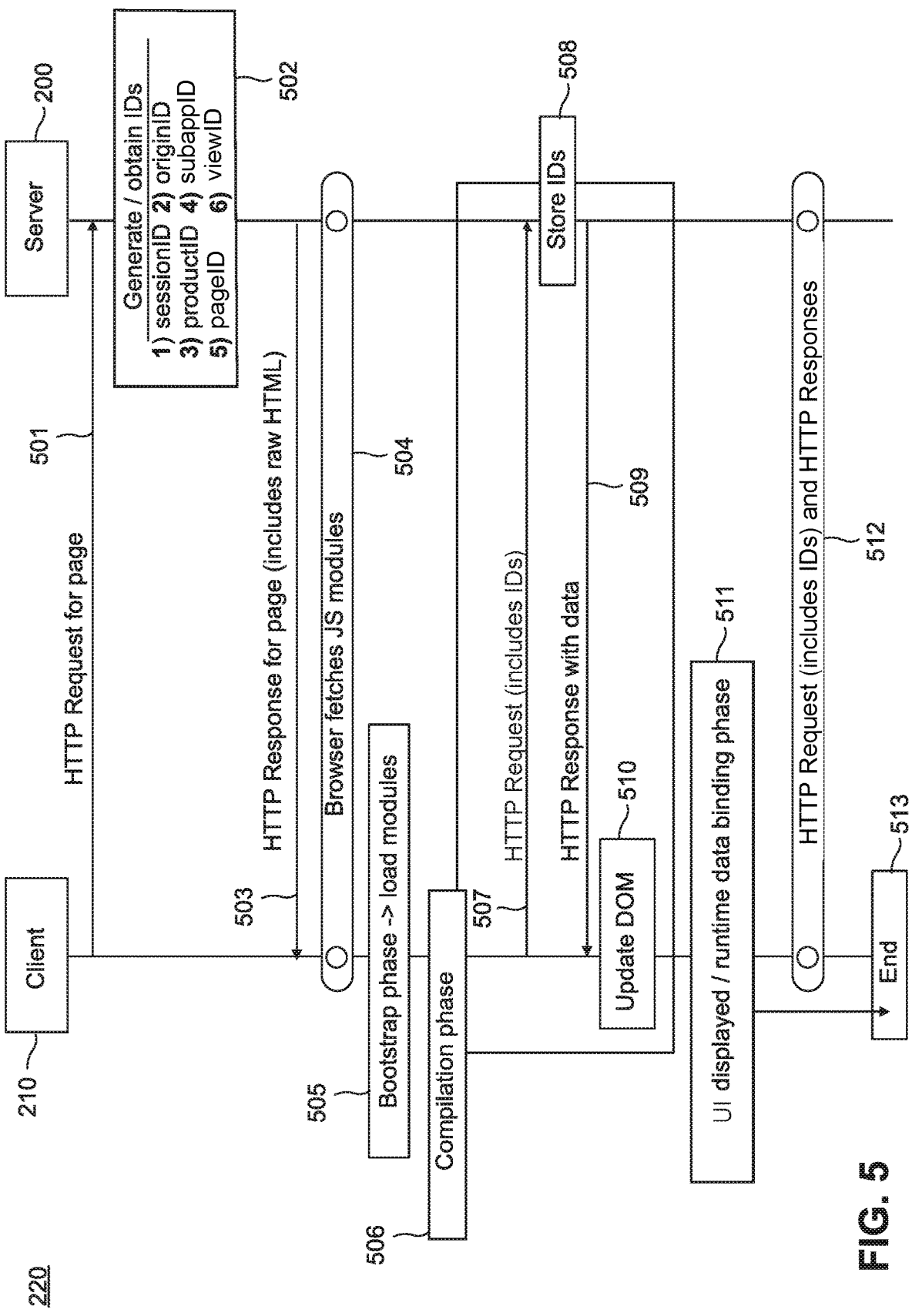
FIG. 5 shows a non-limiting communication process between a client and server in an exemplary system according to the present technology.
Figure 8:
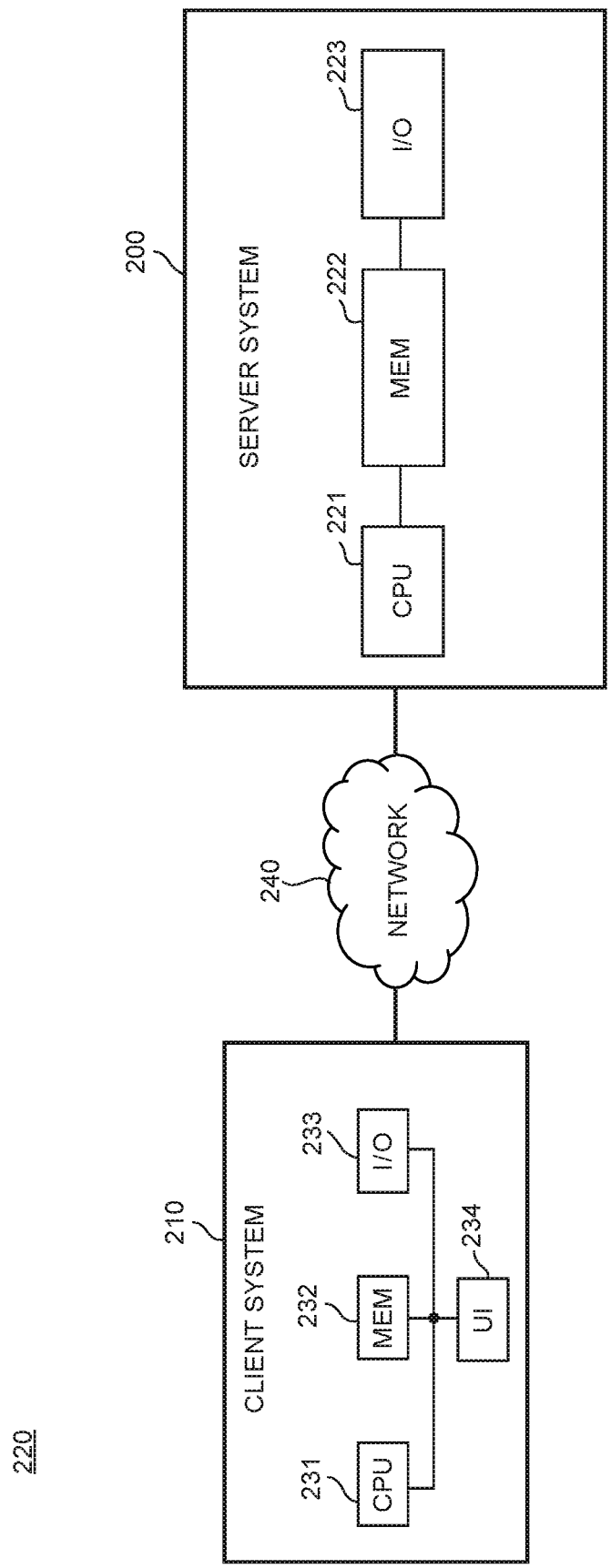
FIG. 8 shows a non-limiting example block diagram of hardware components comprising the system shown in FIG. 2.

FIG. 2 shows an example system in which the framework for identifying and tracking requests described herein may be implemented, wherein software architecture aspects of the system are highlighted. FIG. 3 is an architecture diagram that shows example identifiers associated with an example application. FIG. 4 shows an example portion of an XML configuration file for a web page that incorporates the identifiers. FIG. 5 shows a process wherein pages within an example application are loaded and various identifiers are communicated between a client and server. FIGS. 6A-6G show non-limiting example embodiments of user interfaces and corresponding requests made between a client and server to related to different portions of an example application. FIGS. 7A and 7B show an example user interface displaying a log of activity that includes the identifiers discussed herein. FIG. 8 shows an example system in which the features described herein may be implemented, wherein hardware aspects of the system are highlighted.

In many places in this document, software modules and actions performed by software modules are described. This is done for ease of description; it should be understood that, whenever it is described in this document that a software module performs any action, the action is in actuality performed by underlying hardware components (such as a processor and a memory) according to the instructions and data that comprise the software module.

Description of FIG. 2

FIG. 2 shows a non-limiting example diagram of a system 220 wherein the framework for identifying and tracking requests may be implemented. As will be described below, one or more web applications that implement the framework for identifying and tracking requests can be deployed in the system 220, and the various components in the system 220 (such as the client device 210 and server system 200) can perform different functions related to the deployed web applications. As will be discussed below, FIG. 2 shows primarily software modules (such as the web browser application 211) that run at the client device 210 and server system 200; it should be understood that the software modules shown in FIG. 2 are stored in and executed by hardware components (such as processors and memories); details regarding example hardware components that may be used to execute these software modules are provided below with reference to FIG. 8, as well as in other places in this document.

In the example shown in FIG. 2, the client device 210 can communicate with a server system 200 (e.g., via a network 240). It should be appreciated that the network 240 could comprise a network of interconnected computing devices, such as the Internet. The network 240 could also comprise a local area network (LAN) or could comprise a peer-to-peer connection between the client device 210 and the server system 200.

The server system 200 could comprise any variety of server devices including, but not limited to, database servers, file servers, web servers, application servers, a server cluster (e.g., a cloud based computing environment), a standalone server, and/or any other portable or stationary computing device having server-based capabilities.

The server system 200 can include a web server 204 that performs functionality such as implementing the HTTP protocol and communicating with the web browser application 211 (described in further detail below) in the client device 210 via HTTP. The server system 200 can also include an application server 205 that can, for example, execute server-side (or "back end") instructions for applications that run on the server system 200. The server system 200 can also include a database 206 that manages the persistent storage of data that is used at the server system 200. The database 206 may be or include one or more of: a relational database management system (RDBMS); an object-oriented database management system (OODBMS); an object-relational database management system (OR-DBMS); a not-only structured query language (NoSQL) data store; an object cache; a distributed file system; a data cluster (based on technology such as Hadoop); and/or any other appropriate type of data storage system). As will be described in various places below (including but not limited to relative to FIG. 5), the server system 200 may store log information in the database 206.

The client device 210 can include software components for performing processing related to web applications deployed in the system 220. As a non-limiting example, the client device 210 may have a web browser application 211 consisting of, at least, a rendering module 212, a networking module 213 and a JavaScript module 214. Of course, these modules are a non-limiting example, and the application 211 can comprise several more modules and/or different modules than those shown in FIG. 2. The client device 210 could comprise any variety of client devices including, but not limited to, a personal computer (e.g., a desktop computer, a laptop computer), a thin client, a hybrid client, a rich client, a game console, a tablet, a personal digital assistant (PDA), a smartphone, a digital music player having web interface capabilities, and/or any other portable or stationary computing device.

The rendering module 212 in the client device 210 can implement functionality for the graphical display and rendering of web pages. It can, for example, generate graphical data that corresponds to the HTML and/or DOM that defines a web page processed by the web browser application 211; this graphical data can, potentially after further modification/transformation by the operating system of the client device 210, be displayed on a display of the client device 210. Alternatively or additionally, whenever it is described in this document that the client device 210 renders/displays a web page, the rendering/displaying module 212 may perform functionality related to the rendering/display of the web page.

The networking module 213 can implement the HTTP protocol, and be used to handle various HTTP messages between the client device 210 and the web server 204 in the server system 200. Alternatively or additionally, whenever it is described in this document that the client device 210 communicates using HTTP, the networking module 213 may handle the HTTP aspects of such communications.

The JavaScript module 214 can be used to execute JavaScript scripts, manipulate JavaScript objects, modify the DOMs of web pages loaded at the web browser application 211, and perform other functionality related to JavaScript. The JavaScript module may be, for example, a JavaScript engine, a JavaScript virtual machine, a JavaScript runtime, or any other type of software module capable of executing JavaScript instructions. Alternatively or additionally, whenever it is described in this document that the client device 210 performs functionality related to JavaScript, such functionality may be handled by the JavaScript module 214.

Description of FIG. 3

FIG. 3 shows a non-limiting example structure of the different identifiers that are used with pages in an application. In one example embodiment, the identifiers can be numbers and/or letters that are configured to identify various aspects related to user interaction with pages in the application. The identifiers shown in FIG. 3 may be embedded into code generated by the application server 205 and transmitted to the client device 210 (in which the client uses the code to generate a user interface for display by the web browser 211). When generating the page corresponding to the code transmitted from the server system 200, the web browser application 211 can embed the identifiers into the generated page. When the web browser application 211 sends subsequent HTTP request messages to the server system 200, one or more of the identifiers that were embedded in the generated page may be included as part of the subsequent HTTP request message. Further details regarding how the identifiers shown in FIG. 3 may be communicated in HTTP request messages are provided below with reference to FIG. 5, among other places.

In the example shown in FIG. 3, the identifiers can be separated into at least two groupings including both dynamic identifiers 310 and static identifiers 320. The dynamic identifiers 310 could relate to instances of a user visit to one or more pages in an application where the static identifiers 320 could relate to one or more portions of a generated page. The dynamic identifiers 310 could include, at least, a session identifier (SessionId) 311 and/or an origin identifier (OriginId) 312.

The session identifier 311 is used to identify the user session and help group requests based on the user session. The session identifier 311 is a dynamically created identifier that can be generated by the server system 200 where the identifier is derived from the logged-in user's session identifier. The session identifier 311 can be generated on an initial visit to a page and can be associated with the duration of the visit as the user navigates different features in the application. Unlike other identifiers discussed in more detail below, the session identifier 311 may not be transmitted from the server system 200 to the client device 210 as the session identifier 311 may be generated on the server system 200 side without requiring any additional information from the client device 210.

The origin identifier 312 is another dynamic identifier that can be generated when visiting a page. The origin identifier 312 is used to identify an instance of a page visit. When HTTP requests are made within the same visit to a page, the same value for origin identifier 312 may be used; in subsequent visits to the same page, the value for the origin identifier 312 may be incremented and/or otherwise changed. The list of identifiers that could belong to the dynamic identifiers 310 is non-limiting and the framework described herein envisions more or less identifiers.

The static identifiers 320 include, at least, a product identifier (ProductId) 321, a subapplication identifier (SubAppId) 322, a page identifier (PageId) 323, and/or a view identifier (ViewId) 324. As will be described in further detail below, applications can be organized into a hierarchical tree structure; at the bottom of this hierarchy (in the position of "leaf nodes") are individual views, each of which have their own ViewID 324, and each of which are associated with a page; in turn, at the next level up in the hierarchy, each page has its own PageID 323, and is said to be associated with a subapplication; at the next level up in the hierarchy, each subapplication has its own SubAppID 322, and is associated with a "product" (i.e., web application); products/applications are at the top of the hierarchy (i.e., each product/application can be considered a "root node"), and each product/application has its own ProductID 321. Said another way, each application (which will have its own product identifier 321) according to this hierarchy is composed of a number of subapplications (each of which has its own subapplication identifier 322); each sub application, in turn, is composed of a number of pages (each of which has its own page identifier 323); and each page, in turn, is composed of a number of views (each of which has its own view identifier 324).

The product identifier 321 identifies an application. An application in the context may be defined as a group of web pages (which may be organized at intermediate levels into subapplications, pages, and so on, as noted) that allow an end user to perform a group of activities. As an example, an application may be related to investor relations and allow an investor relations professional to perform tasks related to their position, such as performing analysis of competitor companies and maintaining records of meetings that the user has attended; as another example, an application may be related to press releases and allow public relations professionals to issue press releases. Thus, the product identifier 321 identifies, at a highest level, the application being accessed. Within an application, a subapplication may be defined as a group of pages that have a common purpose and/or facilitate common functionality; similar, a page may have associated with it a number of views that have a common purpose and/or facilitate common functionality.

As an example of an application defined according to this hierarchy, an investor relations application may include a first subapplication (the "Investor Relations" subapplication) and a second subapplication (the "Financials" subapplication). The "Investor Relations" subapplication may include one or more pages, including a "Firm" page that includes information about various companies. The "Firm" page, in turn, may include views that include an "Overview" view (that provides general/overview information about a given company) and a "Firm Contacts" view (that provides contact information for employees of the given company). FIG. 6A and FIG. 6D, which will be described in detail below, show examples of an "Overview" view and a "Firm Contacts" view, respectively, within a "Firm" page within an example investor relations subapplication. The "Financials" subapplication may include one or more pages, including an "Estimates" page that includes a number of views that provide information related to earnings estimates for a given company. The views within the "Estimates" page may include a "Summary" view, a "Details" view, a "Peers" view, and a "Historical" view. FIG. 6F, which will be described in detail below, shows an example of a "Summary" view within an example "Estimates" page.

It should be appreciated that the list of identifiers that could belong to the static identifiers 320 is non-limiting and the framework described herein may be used with more or less identifiers. It should also be appreciated that the framework described herein may include more or less identifiers from either group. As discussed in more detail below, the static identifiers 320 and dynamic identifiers 310 can be incorporated into the code that is used to generate pages.

It should also be appreciated that, while description has been provided in relation to the above-described hierarchy, this is just one example of an application structure within which the logging framework described in this document may be used.

Description of FIG. 4

FIG. 4 shows a non-limiting example of an XML configuration file 400 that includes at least some of the identifiers presented in FIG. 3. In many web application development environments, various attributes of web pages (and/or other components) for an application can be defined in configuration files (which may be XML files, or other types of files). When such an application is deployed, the behavior of the components in the application is determined (at least in part) based on the parameters in the associated configuration files. The XML configuration file 400 shown in FIG. 4 is an example of a configuration file that may be used to configure a web page within such an environment; specifically, the XML configuration file 400 shows an example of how static identifiers (such as the subapplication identifier 322 and the page identifier 323) may be associated with a given page, so that the identifiers may be used in HTTP request messages made by the page and the views associated with the page after deployment. As previously noted, in some embodiments, the features described in this document may be used in conjunction with features from the commonly-assigned application entitled "Software Application Architecture" (U.S. patent application Ser. No. 15/219,913); in such an embodiment, the XML configuration file 400 may be used as a configuration file for a "child module" as defined in the commonly-assigned application.

Building on the example investor relations application described above with respect to FIG. 3, this XML configuration file 400 may be seen as defining attributes for the Firm page, which is in the IR subapplication. As shown in FIG. 4, the XML configuration file 400 includes a page identifier (corresponding to PageID 323 of FIG. 3) with an example value of "100000," as well as a subapplication identifier (corresponding to SubAppID 322 of FIG. 3) with an example value of "10000000." Also as shown in FIG. 4, the Firm page may be associated with views that include an Overview view (with an identifier of "21") and a Firm view (with an identifier of "22").

During the process of developing an application that uses the described logging framework, a software developer may generate a file such as the XML configuration file 400 of FIG. 4, in order to (as noted) define the features and modules with which a given web page within the application is associated. Then, after the application is deployed (e.g., at the server system 200), the modules that make up the web page will use identifiers noted above (such as the page identifier, subapplication identifier, and view identifier) in HTTP request messages. Further details regarding this will be provided below with reference to FIG. 5, among other places.

Description of FIG. 5 through FIG. 7B

FIG. 5 shows a non-limiting communication process between client device 210 and server system 200 in the system 220. FIG. 5 relates to an example web application that uses the described logging framework to communicate the identifiers described herein. In this example, and as will be described in detail below, the content for at least one page within the application is loaded at the client device 210. Although not shown in FIG. 5, the client device 210 may run the web browser application 211 shown in FIG. 2 and described above, and the server system 200 may run software modules such as the web server 204, application server 205, and database 206 shown in FIG. 2 and described above.

At action 501, the client device 210 sends an HTTP request message that includes a URL that points to a web page.

At action 502, the server system 200 begins preparing an HTTP response message to send back to the client device 210. In preparing the response, the server system 200 generates code for rendering a web page on the client device 210. The code can contain at least the session identifier 311 corresponding to the user session and the origin identifier 312 corresponding to an instance of the page visit. The code can also contain at least the product identifier 321, subapplication identifier 322, page identifier 323, and one or more view identifiers 324 corresponding to the page and the content comprising the page requested by the client device 210.

At action 503, the server system 200 can then send an HTTP response message for the page; this response may include HTML code, JavaScript modules (including AngularJS modules) and Javascript code, and other code that corresponds to the page, as well as the identifiers discussed above in relation to action 502. For example, the origin identifier 312, product identifier 321, subapplication identifier 322, page identifier 323, and view identifier 324 could be embedded in the code and then transmitted to the client device 210.

At action 504, the client device 210 can then fetch the different AngularJS modules that are used in the page from the server system 200.

Next, at the bootstrap phase at action 505, the client device 210 can load the various modules retrieved from the server system 200.

During the compilation phase at action 506, an initial user interface for the page is produced for display. To produce the initial user interface, the web browser application may perform actions such as: traversing the DOM for the page; generating a linking function based on the loaded modules; and executing the linking function to produce the HTML that comprises the initial user interface; and attaching any event listeners that make up the received modules to the DOM, thereby producing a dynamic DOM. In an instance where the page includes one or more underlying views, the initial user interface for the page may be produced by an underlying view.

Alternatively or additionally, in some instances, the content (i.e., the HTML and other code and/or data) received by the web browser application may at the beginning of the compilation phase may be only a portion of the content that will ultimately be displayed as part of the user interface of the page. For example, the received portion may relate to navigation features of the page (i.e., header/footer content for the page), but the primary content for the page may not have yet been received. In such an instance, the web browser application may process the received content as described above, and then transmit additional HTTP requests to the server system 200 in order to receive the additional content. An example of how this may be performed is shown in action 507, action 508, and action 509 of FIG. 5, which will be described in the following paragraphs.

At action 507, the client device 210 may transmit an HTTP request message to the server system 200; this HTTP request message may indicate a request for the additional content for the page. Additionally, this HTTP request message may include the identifiers noted relative to action 502 and action 503. It should be appreciated that, in some embodiments, this HTTP request message may be transmitted by an AngularJS view that is included within the page that is being loaded; in such an instance, the view identifier that is included in this HTTP request message will be the view identifier that corresponds to that view.

At action 508, the server system 200 may store the received identifiers in a non-volatile storage of the server system 200. For example, the server system 200 could store the identifiers contained within the HTTP request message in the database 206. Alternatively or additionally, the stored identifiers can be used to generate a log that shows activity related to the HTTP request messages, as will be described in more detail below relative to FIG. 7A and FIG. 7B.

At action 509, the server system 200 can transmit an HTTP response message to the client system 210 that contains the additional requested content. This HTTP response message may include the identifiers noted previously.

At action 510, the client device 210 can update the DOM for the page with the received additional content, and correspondingly update the user interface for the page to reflect the updated DOM.

Although action 507 through action 510 are shown in FIG. 5 as occurring once, these actions 507, 508, 509, 510 may, in various embodiments, be repeated a number of times during the loading of a particular page.

Referring now to FIG. 6A, FIG. 6A builds on the example provided above with respect to FIG. 3 and FIG. 4 that includes an "Overview" view within a "Firm" page within an "IR" subapplication within an "Investor Relations" application. When the client device 210 initially loads the page shown in FIG. 6A, the initial response from server system 200 (e.g., the HTTP response from action 503) can include the header items such as the panel having the "Overview" and "Firm Contacts" tabs, as well as the initial table structure for the body of the page that can include text corresponding to each portion of the table (e.g., "Firm History," "Earnings Q&A," "Key Contacts"). Certain portions of the page can then be populated after the client device 210 makes subsequent HTTP request messages to the server system 200. For example, contacts portion 601 and earnings portion 602 may be populated when the client device 210 makes a subsequent HTTP request message to the server system 200 at action 507 and receive the corresponding content in the HTTP response at action 509.

Figure 6B:
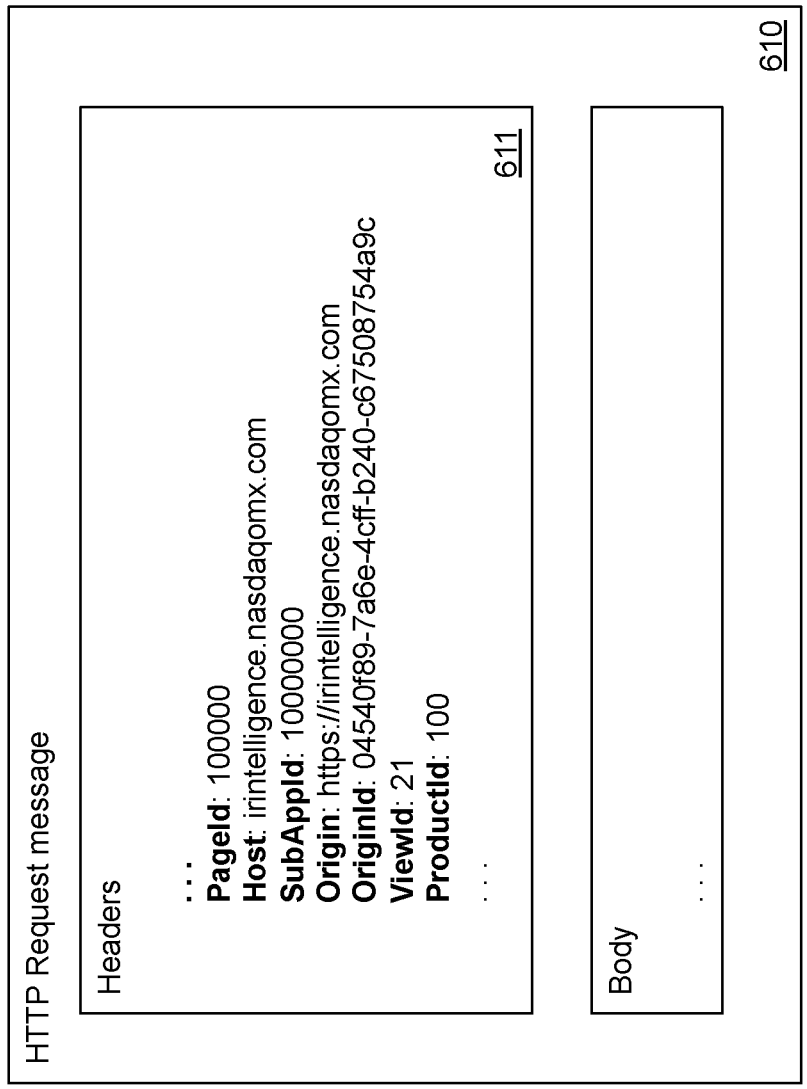

FIG. 6B shows an example HTTP request message 610 made by client device 210 to populate the contacts portion 601 shown in FIG. 6A and transmitted at action 507. The request 610 can include information that allows the server system 200 to identify the content for populating the contacts portion 601 of the page. The request also includes identifiers embedded within the code for the page. As can be seen in FIG. 6B, the client device 210 includes in the request 610 several of the identifiers in an identifier portion 611. These identifiers include the page identifier, subapplication identifier, origin identifier, view identifier, and product identifier. In this example, the product identifier is "100" (which corresponds to the "Investor Relations" product), the "IR" subapplication has a corresponding SubAppId of "10000000," the "Firm" page has a corresponding PageId of "100000," and the "Overview" view has a corresponding ViewId of "21."

Figure 6C:
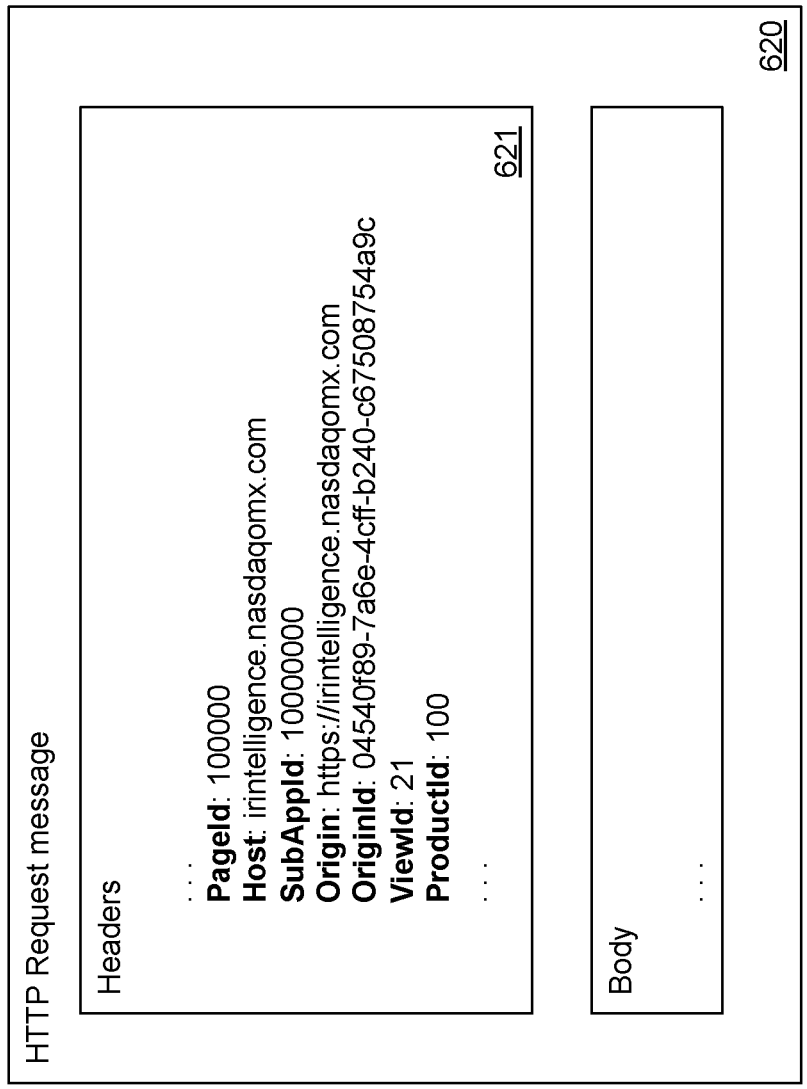

Similar to the request in FIG. 6B, FIG. 6C shows an HTTP request message 620 for populating the content related to the earnings portion 602 shown in FIG. 6A, and which may also be transmitted by the client device at action 507. (For clarity, the HTTP message 610 of FIG. 6B and the HTTP message 620 of FIG. 6C are distinct HTTP messages that would be transmitted by the client device 210 at separate repeats of action 507). The request 620 of FIG. 6C also contains an identifier portion 621 including the identifiers shown in portion 611 of FIG. 6B. As the HTTP request messages 610, 620 from FIG. 6B and FIG. 6C are loading content for the same view within the same page, the identifiers shown in portion 621 will match the identifiers shown in portion 611. That is, portion 611 and 621 both contain the same values for the page identifier, subapplication identifier, origin identifier, view identifier, and product identifier.

Referring again to FIG. 5, during the runtime data binding phase at action 511, the user interface for the page (and/or underlying views for the page) will be displayed at the client device 210. This runtime data binding phase will continue until an event occurs that results in the web browser application in the client system 500 closing Page One (e.g., the user re-loads Page One, closes Page One, or navigates away from the Page One to another page).

During the runtime database binding phase 511, the web browser application may, at action 512, transmit one or more HTTP request messages and receive one or more HTTP response messages. This may occur, for example, when the page transmits background HTTP request messages in order to refresh data displayed at the page. Alternatively or additionally, in an instance where the page includes multiple views, this may occur when the user navigates to a different view for the page. In such an instance, the HTTP request messages and HTTP response messages communicated at action 512 may relate to requesting and receiving the content for the user interface for the different view. During action 512, the identifiers noted above (page identifier, subapplication identifier, origin identifier, view identifier, and product identifier) may be included in the HTTP request messages. And, though not shown in FIG. 5, when these HTTP request messages are received at the server system 200, the included identifiers may be stored as described above relative to action 508.

Referring now to FIG. 6D and continuing with the example mentioned above relative to FIG. 6A through FIG. 6C, FIG. 6D shows an example where an HTTP request is made to change the view to a "Firm Contacts" view 630 within the "Firm" page of the "IR" subapplication in the "Investor Relations" product. More specifically, FIG. 6D shows an example where the view changes from the "Overview" view (shown in FIG. 6A) to a "Firm Contacts" view 630, which may be performed at action 512. The "Firm Contacts" view 630 is specifically loaded with content related to one or more contacts 631 associated with a company/firm. When making the request to load the "Firm Contacts" view 630, the client device 210 transmits an HTTP request message for loading the content in the view and includes the identifiers described herein in the request.

Figure 6E:
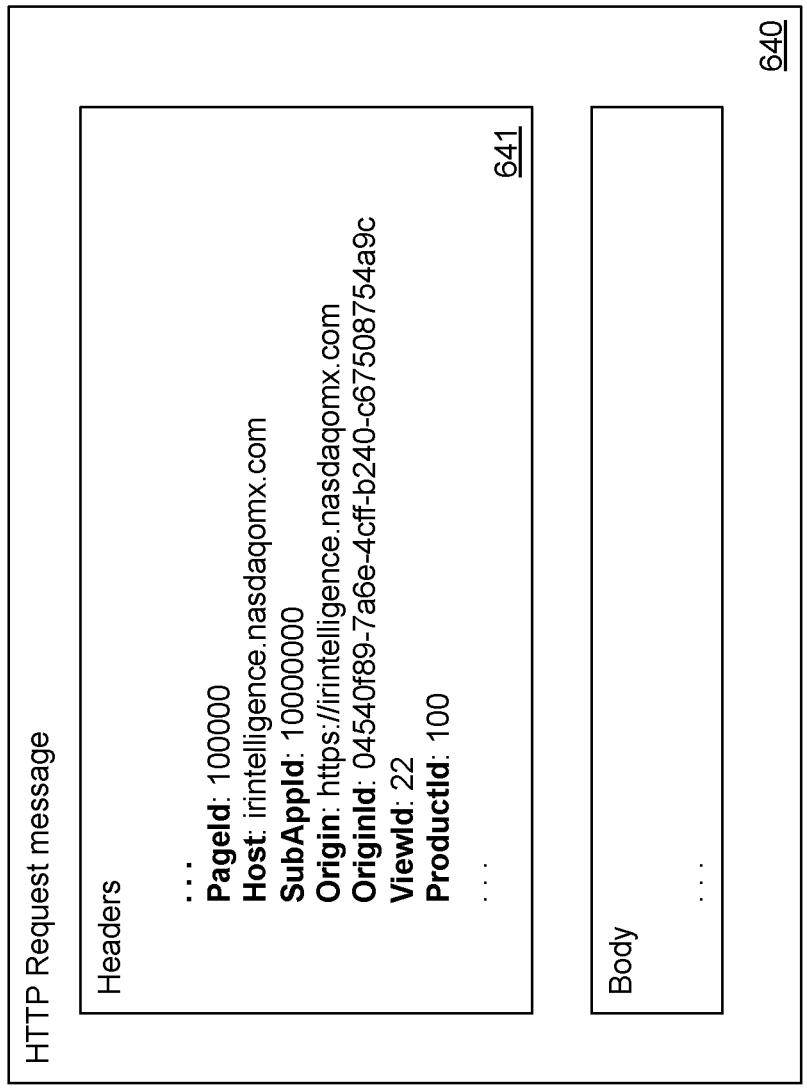

FIG. 6E shows another example HTTP request message 640 for loading the data in the "Firm Contacts" view 630. Much like the requests in FIGS. 6B and 6C, HTTP request message 640 includes an identifier portion 641 that contains the identifiers related to the product/subapplication/page/view. In this example, the identifiers in portion 641 match the identifiers in portions 621 and 631, except for the view identifier 324. More specifically, the view identifier 324 in portion 641 has a ViewId of "22" where the view identifier 324 in portions 621 and 631 has a ViewId of "21." While the other identifiers in portion 641 are the same as those in portions 621 and 631, view identifier 324 is different because the view in FIG. 6D corresponds to a changed view from the "Overview" view shown in FIG. 6A to the "Firm Contacts" view shown in FIG. 6D. As the view shown in FIG. 6D still originates from the same product, subapplication, and page as that in FIG. 6A, the identifiers corresponding to the product/subapplication/page remain the same.

Figure 6G:
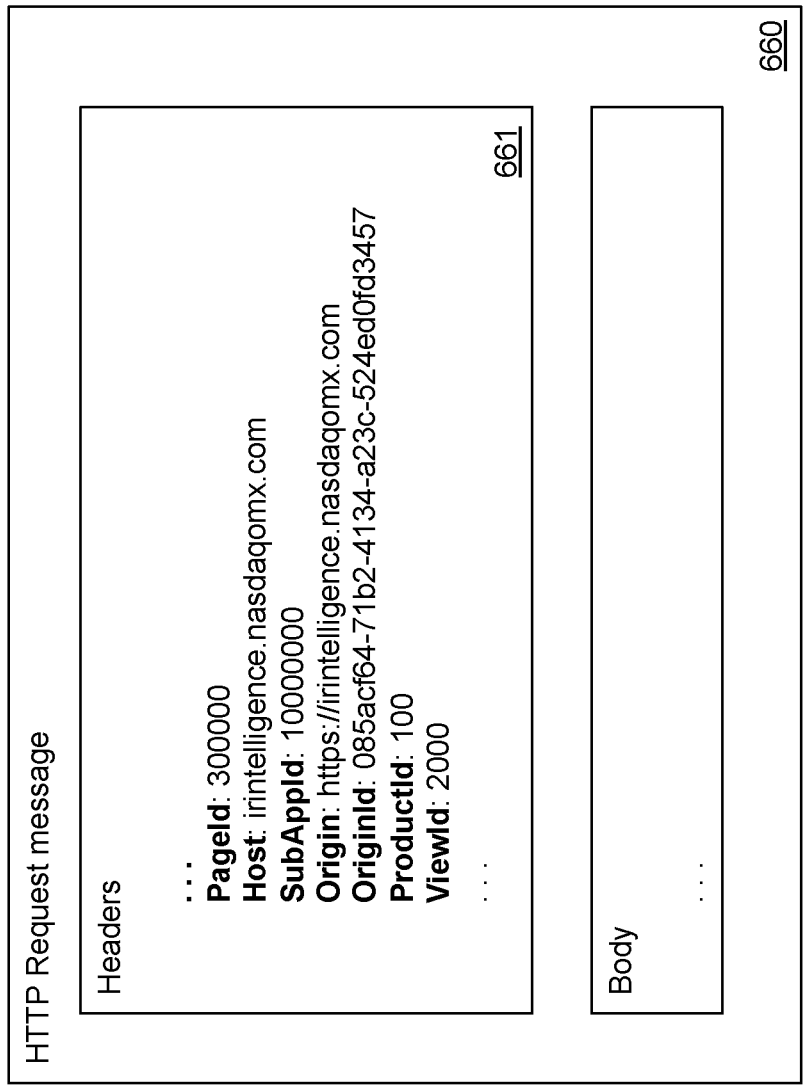

FIG. 6F shows an example where the user has navigated to another page (the "Estimates" page) within the example "Investor Relations" product. The example shown in FIG. 6F relates to a "Summary" view 650 within an "Estimates" page of a "Financial" subapplication of the investors relation product. The "Summary" view 650 provides an estimate summary portion 651 related to financial estimates for a business. FIG. 6G shows the corresponding HTTP request message 660 made by client device 210 when requesting content for the "Summary" view 650. Similar to requests 610, 620, and 640, request 660 contains an identifier portion 661 including the origin identifier, product identifier, subapplication identifier, page identifier, and view identifier. As the page loaded in FIG. 6F is related to a different view, page, and subapplication than that shown in FIGS. 6A and 6D, the only identifier in portion 661 that matches the identifiers in portions 611, 621, and 641 is the product identifier 321. That is, the origin identifier 312, subapplication identifier 322, page identifier 323, and view identifier 324 all differ from the identifiers shown in portions 611, 621, and 641. And as the "Estimates" page loaded in FIG. 6F is a different page from the page shown in FIG. 6A through FIG. 6D, the method of FIG. 5 would be repeated from the beginning to load the "Estimates" page (i.e., the HTTP request message 660 would be transmitted at action 501 in order to load the new "Estimates" page).

As discussed above, the identifiers communicated between the client device 210 and server system 200 can be stored in a nonvolatile memory of the server system 200 and recorded in a log (e.g., in a database 206 of server system 200). The server system 200 can optionally generate a user interface for display on the client device 210 that provides information from the log, as discussed in more detail below. FIGS. 7A and 7B show a non-limiting example embodiment of a user interface 700 generated for display showing one or more aspects of the log for tracking and identifying requests. It should be appreciated that the user interface 700 shown in FIGS. 7A and 7B represent an "admin" view that can be accessed by any client device communicating with the server system 200. That is, an administrator would normally have access to the user interface 700 shown in FIGS. 7A and 7B (as well as the user interfaces shown in FIGS. 6A, 6D, and 6F), while an end user may not necessarily have access to the interface 700, but instead can only access the interfaces shown in FIGS. 6A, 6D, and 6F.

The user interface 700 in FIGS. 7A and 7B show activity between the client device 210 and server system 200 when the user interfaces shown in FIGS. 6A, 6D, and 6F are being accessed and navigated by a user. For example, FIGS. 7A and 7B can show different operations 706 performed by a user having a user identifier 703 and a user name 704. In this example, the user having user name 704 is "Sample@company.com" and the user has an associated user identifier 703 of 1069726.

In the example shown in FIG. 7A, the user is navigating different aspects of a particular application 702 related to "IRSuite." This navigation could have one or more various parameters 705 associated with the navigation and each operation could also have a corresponding identifier 701. Thus, the portion of the log shown in FIG. 7A can display various details related to specific operations carried out by a user as they navigate and make requests when navigating the application.

FIG. 7B shows another example portion of the log that can be generated on the user interface 700. The line items shown in FIG. 7B could correspond to the line items displayed in FIG. 7A, but displayed farther along a horizontal axis. For example, these items shown in FIG. 7B could be displayed as a result of a user "scrolling" to the right on the user interface 700.

In one example, the log shown in FIG. 7B could include a date and time 708 in which the user accessed a particular feature as well as the elapsed time 707 during which the user was viewing and/or navigating a particular feature. As can be seen in FIG. 7B, the log can also display the tracked dynamic identifiers including the session identifier 311 and the origin identifier 312. Likewise, each specific request could have an associated request identifier (RequestId) 709 corresponding to one or more requests made when navigating the application.

FIG. 7B also shows several example static identifiers related to different portions of the application. In the example shown in FIG. 7B, the product identifier 321, subapplication identifier 322, page identifier 323, and view identifier 324 are all displayed in association with one or more requests being made. As shown in the XML configuration file 400 of FIG. 4, the user could be accessing different aspects related to the "Financial" subapplication which has a corresponding subapplication identifier 322 of "20000000."

By using the logs generated in FIGS. 7A and 7B, a developer could identify different viewing and navigation habits of a particular user that is accessing an application. This information could also aid the developer in various aspects of application development that could include troubleshooting different aspects of an application that may not be working properly. In certain example embodiments, the viewing and navigation habits of users that are recorded by the server system 200 can be aggregated and used to present an overall view of an application. This can allow identification of features of an application that are being used more than others.

Description of FIG. 8

FIG. 8 shows a non-limiting example block diagram of a hardware architecture for the system 220. In the example shown in FIG. 8, the client device 210 communicates with a server system 200 via a network 240. The network 240 could comprise a network of interconnected computing devices, such as the internet. The network 240 could also comprise a local area network (LAN) or could comprise a peer-to-peer connection between the client device 210 and the server system 200. As will be described below, the hardware elements shown in FIG. 8 could be used to implement the various software components and actions shown and described above (relative to FIG. 2, FIG. 5, and in other places) as being included in and/or executed at the client device 210 and server system 200.

For example, the client device 210 (which may also be referred to as a "client system") in FIG. 8 could include a processor 231, a memory 232, an input/output device 233 (which may also be referred to as a "network interface device"), and a display device 234. The processor 231 and memory 232 together may be referred to as a "processing system."

The processor 231 may be or include, for example, a single- or multi-core processor, a plurality of microprocessors, a digital signal processor (DSP), one or more microprocessors in association with a DSP core, one or more Application Specific Integrated Circuits (ASICs), one or more Field Programmable Gate Array (FPGA) circuits, or a system-on-a-chip (SOC). Alternatively or additionally, the processor 231 may be configured to use an instruction set architecture such as x86, ARM, and/or any other instruction set architecture.

The memory 232 may be or may include one or more devices such as a RAM (such as a D-RAM or S-RAM), a hard disk, a flash memory, a magneto-optical medium, an optical medium, or other type of device for volatile or non-volatile data storage.

The I/O device 233 may include one or more devices such as a baseband processor and/or a wired or wireless transceiver. The I/O device 233 may communicate any of the data described herein (including but not limited to HTTP messages) as communicated by the example web browser application 211 and/or the client device 200. The I/O device 233 implement layer one, layer two, and/or other layers for communications according to numerous formats, standards, protocols, or technologies, such as but not limited to Ethernet (or IEEE 222.3), ATP, Bluetooth, and TCP/IP, TDMA, CDMA, 3G, LTE, LTE-Advanced (LTE-A), and communications performed by the I/O device 233 may be performed using such technologies.

The display device 234 may be a (Liquid Crystal Display (LCD) display, Light Emitting Diode (LED) display, or other type of display. Although it is described above that the display device 234 may be included in the client device 210, the display device 234 may also, in various embodiments, be external to the client device 210 and connected to the client device 210; for example, the display device 234 may be an external monitor, projector, or other type of display device.

It should be appreciated that the combination of elements 231, 232, 233, 234 in client device 210 could be used to implement each or any combination of the actions, activities, or features described herein as performed by the example web browser application 211 of FIG. 2 and/or the client device 200. For example, the memory 232 could process and communicate the described identifiers and/or otherwise store the data described herein as processed and/or otherwise handled by the web browser application 211 and/or the and/or the client device 200; and the processor 231 could be used to operate the rendering module 212, networking module 213, and JavaScript module 214, and/or otherwise process the data described herein as processed by the web browser application 211 and/or the client device 200.

Alternatively or additionally, the memory 232 in the client device 210 may store instructions which, when executed by the processor 231, cause the processor 231 to perform (in conjunction with, as appropriate, the other elements 232, 233, 234 in the client device 210), each or any combination of the actions, activities, or features described herein as performed by the client device 210 of FIG. 2, example web browser application 211 of FIG. 2, and/or the client device 200.

Although the client device 210 has been described above as having a single processor 231, single memory 232, and single input/output device 233, in various embodiments, the client device 210 may include one or more processors (i.e., at least one processor), one or more memories (i.e., at least one memory), and/or one or more input/output devices (i.e., at least one input/output device), having the respective characteristics and/or capable of performing the respective activities described above as performed by the single processor 231, memory 232, and input/output device 233.

Server system 200 also comprises various hardware components used to implement the software elements for server system 200 of FIG. 2. As shown in FIG. 8, the server system 200 could include hardware components such as a processor 221, a memory 222, and an input/output device 223. The processor 221, memory 222, and input/output device 223 may be the same types of devices, possess the same or similar properties, and/or perform analogous functionality as the processor 231, memory 232, and input/output device 233, respectively, as described above with reference to the client device 210. The processor 221 and memory 222 may together be referred to as a "processing system."

The memory 222 in the server system 200 could be used to store data related to the identifiers and/or any of the other data described herein as processed and/or otherwise handled by the server system 200. The processor 221 could be used in performing all of the processing described herein as performed by the server system 200.

Likewise, I/O device 223 can be used by the server system 200 to transmit and/or receive any of the data described herein (including but not limited to HTTP messages included identifiers) as described herein as communicated by the server system 200.

Alternatively or additionally, the memory 222 in the server system 200 may store instructions which, when executed by the processor 221, cause the processor 221 to perform (in conjunction with, as appropriate, the other elements 222, 223 in the server system 200), each or any combination of the actions, activities, or features described herein as performed by the server system 200.

Although the server system 200 has been described above as having a single processor 221, single memory 222, and single input/output device 223, in various embodiments, the server system 200 may include one or more processors (i.e., at least one processor), one or more memories (i.e., one or more memories), and/or one or more input/output devices (i.e., one or more input/output devices), having the respective characteristics and/or capable of performing the respective activities described above as performed by the single processor 221, memory 222, and input/output device 223.

Of course, the hardware configurations shown in FIG. 8 are non-limiting examples, and the subject matter described herein may be utilized in conjunction with a variety of different hardware architectures and elements. For example: in many of the Figures in this document (including but not limited to in FIG. 5), individual functional/action blocks are shown; in various embodiments, the functions of those blocks may be implemented using (i) individual hardware circuits, (ii) using applications specific integrated circuitry (ASIC), (iii) using one or more digital signal processors (DSPs), (iv) using the hardware configuration described above with reference to FIG. 8, (v) via other hardware arrangements, architectures, and configurations, and/or via combinations of the technology described in (i) through (v).

Technical Advantages of Described Concepts

In identifying and tracking the different requests made by a user, a developer and/or administrator of an application can use this information to better understand the viewing habits of individual users (or a user population).

Furthermore, the developer and/or administrator could also specifically identify which aspects of an application may cause more runtime issues than others and use the identifiers to help debug and address such problems. This is particularly true given that the identifiers are granular enough to provide information specific to particular views, while also broad enough to provide information related to more broadly defined components within an application, such as subapplications and pages. Thus, the technology advantageously tracks and identifies different aspects of user behavior and application performance, thereby allowing developers to improve the overall design of an application.

It should be appreciated that the technology described in this document includes many advantages and the advantages mentioned above are non-exhaustive; additionally, it should also be appreciated that while some advantages or combinations of advantages may be present in some embodiments, some advantages or combinations of advantages may not be present in other embodiments; and the advantages of particular embodiments, including those described above, should not be construed as limiting other embodiments or the Claims.

Further Applications of Described Subject Matter

In the examples described herein, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific described details. In other instances, detailed descriptions of well-known methods, devices, techniques, etc. are omitted so as not to obscure the description with unnecessary detail.

While the subject matter of this document has been described in relation to Javascript technology, AngularJS technology, and other specific technologies, this is done for ease of description; it is to be understood that the subject matter described in this document is applicable in the context of any other appropriate technology, including but not limited to in the context of other SPA technologies, other scripting technologies and/or languages, and/or other web technologies.

While the above subject matter has been described in connection with what is presently considered to be the most practical and preferred embodiment, it is to be understood that the described subject matter is not to be limited to the disclosed embodiments, but on the contrary, the described subject matter should be considered to cover various modifications and equivalent arrangements.

The invention claimed is:

1. A system configured to generate a web application, comprising:
   a server system having at least one memory and at least one processor, the server system configured to:
   receive a first request for first data for a page in a single page application (SPA), wherein the single page application is composed of a hierarchy of components that includes one or more pages, and wherein each of the one or more pages includes one or more views;
   transmit a first response containing the first data for the page in the SPA, wherein the first data includes:
   software code for generating the page in the SPA;
   a plurality of static identifiers, wherein the plurality of static identifiers include a page identifier that identifies the page in the SPA and a first view identifier that identifies a first view within the page in the SPA, and the page identifier is associated with multiple view identifiers corresponding to different views within the page; and
   one or more dynamic identifiers, wherein the plurality of static identifiers and the one or more dynamic identifiers are embedded within the software code for generating the page in the SPA;
   receive a second request for second data containing content for the first view within the page, wherein the second request includes the plurality of static identifiers;
   store the plurality of static identifiers, including at least the page identifier and the first view identifier, received in the second request, in the memory; and
   transmit the second data containing the content for the first view within the page, and
   a client device having at least one memory and at least one processor, the client device configured to:
   receive the first data from the server based on the first request;
   process the first data for generating the page in the SPA;
   transmit the second request for the second data containing the content for the first view within the page, wherein the second request includes the plurality of static identifiers;
   receive the second data containing the content for the first view within the page;
   generate for display a user interface containing the page in the SPA, wherein at least a portion of the page in the SPA includes the content for the first view within the page; and
   transmit a third request for third data associated with the page in the SPA, wherein the third request includes the plurality of static identifiers including at least the page identifier and a second view identifier that identifies a second view within the page in the SPA;
   wherein the server system is further configured to:
   receive the third request including the plurality of static identifiers and the second view identifier that identifies the second view within the page in the SPA;
   generate the third data based on the second view identifier, wherein the third data includes content for the second view; and
   transmit the third data to the client device, wherein the client device is configured to update the user interface using the third data by keeping the page in the SPA loaded while updating the portion of the page in the SPA that includes the content for the first view with the content for the second view, wherein a log stored in the server system contains the one or more dynamic identifiers and the plurality of static identifiers showing user navigation of the SPA.

2. The system of claim 1, wherein
the client device is further configured to:
transmit a fourth request for fourth data based on user input made in association with the user interface, wherein the fourth request contains the plurality of static identifiers including at least the page identifier and a third view identifier that identifies a third view within the page in the SPA, and
the server device is further configured to:
receive the fourth request for the fourth data;
generate the fourth data including the content for the third view; and
transmit the fourth data to the client device.

3. The system of claim 1, wherein
the plurality of static identifiers further include a product identifier and a subapplication identifier, and
the product identifier, the subapplication identifier, the page identifier, and the first view identifier correspond to the hierarchy of components in the SPA where the product identifier is associated with a highest level in the hierarchy and the first view identifier is associated with a lowest level in the hierarchy.

4. The system of claim 1, wherein the client device is further configured to:
receive additional data from the server, containing content for a log user interface page in the software application; and
generate for display a log user interface containing the log user interface page in the software application.

5. The system of claim 4, wherein the displayed log user interface page includes a portion of the log associated with user navigation of the SPA, and wherein the portion includes the plurality of static identifiers, including the page identifier and the first and second view identifiers, and the one or more dynamic identifiers.

6. The system of claim 1, wherein:
the first view includes an overview view and the page includes a firm page within an investor relation application; and
the second view includes a firm contacts view within the firm page included in the investor relation application.

7. The system of claim 1, wherein:
the first view includes a summary view and the page includes an estimates page within an investor relation application; and
the second view includes a historical view within the estimates page included in the investor relation application.

8. The system of claim 1, wherein
the third request includes the page identifier having a same value as the page identifier included with the first request, and
the second view identifier included in the third request having a different value as the first view identifier included with the first request.

9. The system of claim 1, wherein a configuration file is associated with the SPA, and the configuration file includes the plurality of static identifiers and the one or more dynamic identifiers associated with a plurality of pages and a plurality of views within the plurality of pages in the SPA.

10. A server system, comprising:
a network interface device;
a processor; and
a memory configured to store computer readable instructions that, when executed by the processor, cause the server system to:
receive a first request, from a client device, for first data for a page in a single page application (SPA), wherein the single page application is composed of a hierarchy of components that includes one or more pages, and wherein each of the one or more pages includes one or more views;
transmit a first response, to the client device, containing the first data for the page in the SPA, wherein the first data includes a plurality of static identifiers that include a page identifier, that identifies the page in the SPA, and a first view identifier, that identifies a first view within the page in the SPA;
receive a second request, from the client device, for second data containing content for the first view within the page, wherein the second request includes the plurality of static identifiers;
store the plurality of static identifiers, including at least the page identifier and the first view identifier, received in the second request, in the memory;
generate the second data containing the content for the first view within the page;
transmit the second data to the client device, wherein the client device is configured to render the page in the SPA by generating a user interface containing the page in the SPA, wherein at least a portion of the page in the SPA includes the content for the first view within the page;
receive a third request for third data associated with the page in the SPA, wherein the third request includes the plurality of static identifiers including at least the page identifier and a second view identifier that identifies a second view within the page in the SPA;
generate the third data based on the second view identifier, wherein the third data includes content for the second view; and
transmit the third data to the client device, wherein the client device is configured to update the user interface using the third data by keeping the page in the SPA loaded while updating the portion of the page in the SPA that includes the content for the first view with the content for the second view.

11. The server system of claim 10, wherein the server system is further caused to:
receive a fourth request for fourth data based on user input made in association with the user interface, wherein the fourth request contains the plurality of static identifiers including at least the page identifier and a third view identifier that identifies a third view within the page in the SPA.

12. The server system of claim 11, wherein the server system is further caused to:
generate the fourth data including the content for the third view; and
transmit the fourth data to the client device.

13. The server system of claim 10, wherein the plurality of static identifiers further include a product identifier and a subapplication identifier.

14. The server system of claim 13, wherein the product identifier, the subapplication identifier, the page identifier, and the first view identifier correspond to the hierarchy of components in the SPA where the product identifier is associated with a highest level in the hierarchy and the first view identifier is associated with a lowest level in the hierarchy.

15. The server system of claim 10, wherein the plurality of static identifiers and the one or more dynamic identifiers are stored in the memory in a log for tracking and identifying requests associated with user navigation of different views within the page of the SPA.

16. A method for generating a web application, comprising:
   at an information processing system having at least a processor and a memory:
      receiving a first request for first data for a page in a single page application (SPA), wherein the single page application is composed of a hierarchy of components that includes one or more pages;
      transmitting a first response containing the first data for the page in the SPA, wherein the first data includes a plurality of static identifiers that include a page identifier, that identifies the page in the SPA, and a first view identifier, that identifies a first view within the page in the SPA;
      receiving a second request for second data containing content for the first view within the page, wherein the second request includes the plurality of static identifiers
      storing the plurality of static identifiers, including at least the page identifier and the first view identifier, received in the second request, in the memory;
      generating the second data containing the content for the first view within the page;
      transmitting the second data, wherein the second data is used to render the page in the SPA by generating a user interface containing the page, wherein at least a portion of the page in the SPA includes the content for the first view within the page;
      receiving a third request for third data associated with the page in the SPA, wherein the third request includes the plurality of static identifiers including at least the page identifier and a second view identifier that identifies a second view within the page in the SPA;
      generating the third data based on the second view identifier, wherein the third data includes content for the second view; and
      transmitting the third data to the client device, wherein the client device is configured to update the user interface using the third data by keeping the page in the SPA loaded while updating the portion of the page in the SPA that includes the content for the first view with the content for the second view.

17. The method of claim 16, further comprising:
   receiving a fourth request for fourth data based on user input made in association with the user interface, wherein the fourth request contains the plurality of static identifiers including at least the page identifier and a third view identifier that identifies a third view within the page in the SPA.

18. The method of claim 16, wherein the plurality of static identifiers further include a product identifier and a subapplication identifier.

19. The method of claim 18, wherein the product identifier, the subapplication identifier, the page identifier, and the first view identifier correspond to the hierarchy of components in the SPA where the product identifier is associated with a highest level in the hierarchy and the first view identifier is associated with a lowest level in the hierarchy.

20. The method of claim 16, wherein the plurality of static identifiers and the one or more dynamic identifiers are stored in the memory in a log for tracking and identifying requests associated with user navigation of different views within the page of the SPA.

* * * * *